United States Patent
Swoboda et al.

(10) Patent No.: US 9,189,354 B2
(45) Date of Patent: Nov. 17, 2015

(54) PSEUDO DEDICATED DEBUG PORT WITH AN APPLICATION INTERFACE

(71) Applicant: Texas Instruments Incorporated, Dallas, TX (US)

(72) Inventors: Gary L Swoboda, Sugar Land, TX (US); Jason L Peck, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 161 days.

(21) Appl. No.: 13/966,698

(22) Filed: Aug. 14, 2013

(65) Prior Publication Data

US 2014/0053023 A1    Feb. 20, 2014

Related U.S. Application Data

(60) Provisional application No. 61/683,831, filed on Aug. 16, 2012.

(51) Int. Cl.
G06F 11/00 (2006.01)
G06F 11/273 (2006.01)
G06F 11/36 (2006.01)

(52) U.S. Cl.
CPC ........ *G06F 11/2733* (2013.01); *G06F 11/3656* (2013.01)

(58) Field of Classification Search
CPC ........................... G06F 11/2733; G06F 11/273
USPC ......................................... 714/30, 32, 33, 34
See application file for complete search history.

(56) References Cited

U.S. PATENT DOCUMENTS

| 6,367,032 | B1 * | 4/2002 | Kasahara | 714/25 |
| 6,928,629 | B2 * | 8/2005 | Johnson | 716/136 |
| 2006/0059249 | A1 * | 3/2006 | Wei et al. | 709/220 |
| 2008/0126872 | A1 * | 5/2008 | Butcher et al. | 714/38 |
| 2013/0343378 | A1 * | 12/2013 | Veteikis et al. | 370/389 |

* cited by examiner

*Primary Examiner* — Dieu-Minh Le
(74) *Attorney, Agent, or Firm* — Robert D. Marshall, Jr.; Frank D. Cimino

(57) ABSTRACT

A method is shown to provide remote access to one or more debug access points whose functions include capabilities other than accessing memories across an application interface such as USB, IEEE 802.3 (Ethernet) and other protocols. The capabilities available include all or many of the capabilities provided by a dedicated debug interface.

12 Claims, 3 Drawing Sheets

PSEUDO DEDICATED DEBUG PORT WITH AN APPLICATION INTERFACE

CLAIM OF PRIORITY

This application claims priority under 35 U.S.C. 119(e)(1) to Provisional Application No. 61683831 filed 16 Aug. 2012.

TECHNICAL FIELD OF THE INVENTION

The technical field of this invention is software and hardware debug.

BACKGROUND OF THE INVENTION

Current state of the art debug of general purpose processors takes two forms:
1. A lesser set of visibility and control provided through an application interface.
2. A wide range of visibility and control provided with a dedicated debug interface.

In both of the above cases the debug control function provides a means to access debug features on-chip that support visibility into the current state of the processor(s) and even historical information about the state of an application. Some examples of this include: writing/reading system memory, viewing the contents of caches, controlling the execution of application programs, setting/clearing breakpoints, etc.

SUMMARY OF THE INVENTION

The described invention provides access to one or more Access Points (AP) whose functions include capabilities other than merely accessing memory across an application interface such as USB, IEEE 802.3 (Ethernet), IEEE 802.11 (WLAN), IEEE 1394 (Firewire), etc.

With this approach the capabilities available in the current art for debug using an applications interface are expanded to include all or many of the capabilities provided by current art with a dedicated debug interface. This makes an application interface appear to be a pseudo dedicated Debug Port. Debug may in some cases use the application interface facilities concurrently with other system activities in cases where the system remains operable during debug. This does however reduce the amount of application interface bandwidth available to these activities

BRIEF DESCRIPTION OF THE DRAWINGS

These and other aspects of this invention are illustrated in the drawings, in which.

DETAILED DESCRIPTION OF PREFERRED EMBODIMENTS

Debug using an application interface generally provides a means to find and fix problems in the operation of a stable Target System (TS), where the problems do not make the system inoperable. The debug capabilities utilize applications resources to a level of visibility and control that facilitates debug of software components in the target system. The applications interface is typically used once bring-up is complete and in subsequent phases of a product's lifecycle. The use of these debug facilities can however be intrusive and change the way the application works. This is generally tolerable except in extreme real-time applications.

Figure 1:
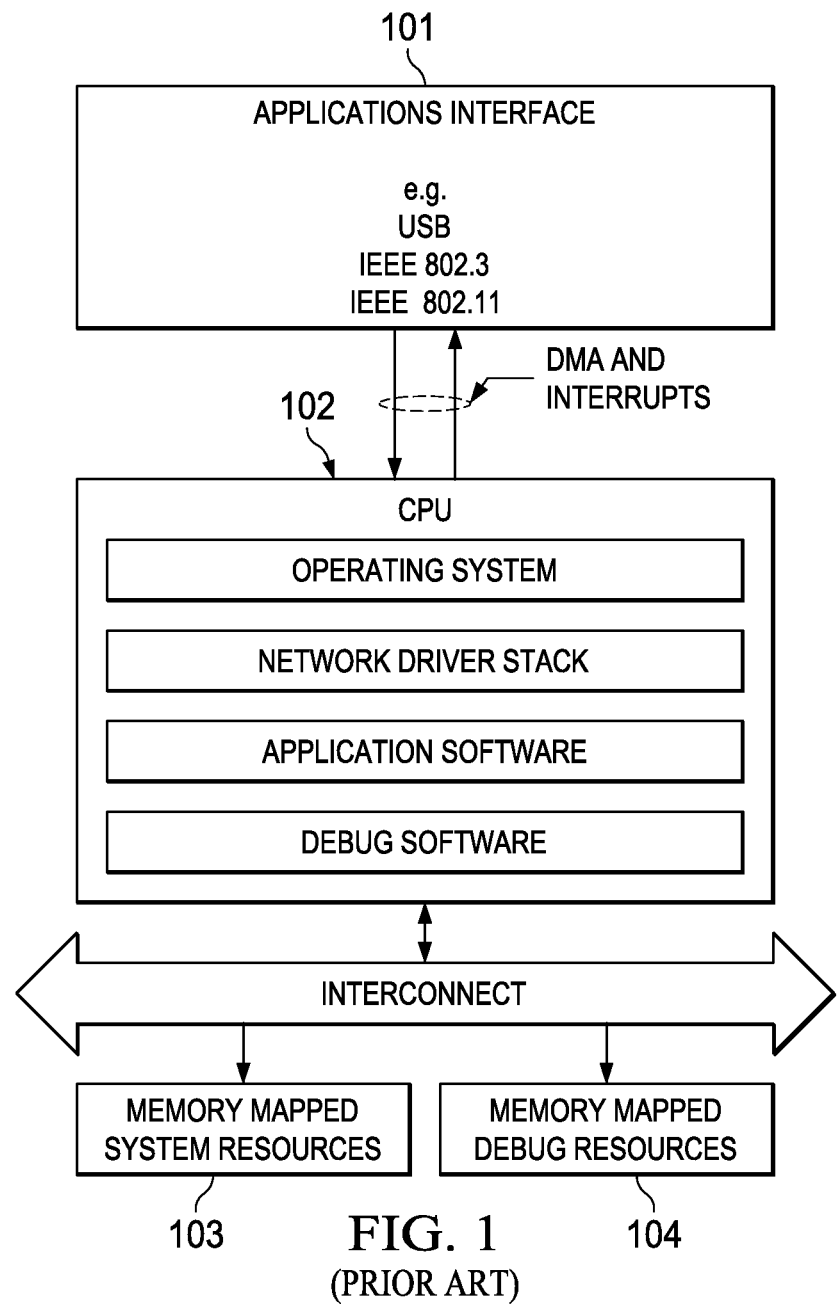
FIG. 1 shows a block diagram of debug over an application interface.

FIG. 1 shows an illustration of a typical implementation of debug using an applications interface.

A debug application (local within the target system or remote to the target system) communicates with application software running on the target system to provide debug services via an applications interface 101 such as USB, IEEE 802.3 (Ethernet), IEEE 802.11 (WLAN), etc. The application interface 101 communicates with CPU 102 that is part of the target system. The debug software executes on CPU 102, using system resources 103 and debug resources 104

An advantage of using an applications interface for debug is that it is accessible in a product's final form and can in many cases be accessed using a network. This means debug can be performed by someone in location A on a target system in location B. The disadvantage is that certain types of errors can block the capability's availability. Since the application software must continue to run to provide the aforementioned debug services, certain system malfunctions can disrupt the running of this software to an extent that makes these debug services unusable. Examples of this are bus hangs and errors within the application's interface drivers.

Debug using a dedicated interface is typically used during the development and bring-up phases of a product's lifecycle and in many instances can be minimally intrusive, having little to no effect on the normal system operation (when the system is running the application). It generally provides a means to find and fix problems that can make the target system (TS) inoperable. Such problems include bus hangs, power management failures, phantom resets, and other fatal errors.

These are capabilities that are not generally available in the set of debug capabilities provided by applications interface. They may provide the ability to view of the state of clock and reset logic, voltage, power domains, power management logic, bus control logic and the like. In addition, these capabilities may provide very fine granularity of controlling the execution of CPU cores. For instance, a processor with multiple cores will likely support a debug control function that can be used to halt and advance the state of those cores instruction by instruction. It may also provide a means to modify the state of caches, override the state of various clock, reset, voltage, and power domains, and modify the operational state of processing elements in the processor.

Figure 2:
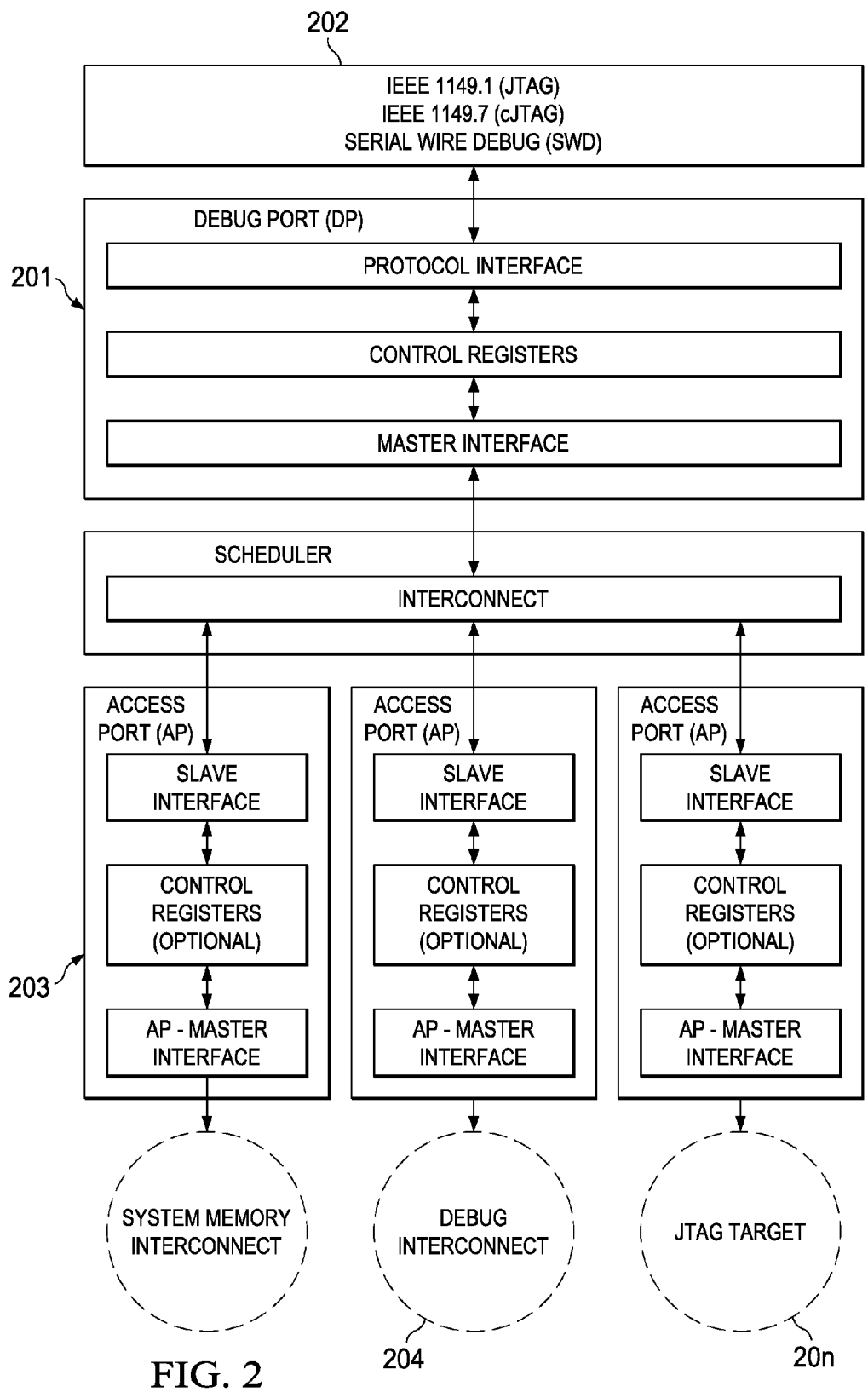
FIG. 2 shows a debug access port created with a dedicated debug interface.

The dedicated debug interface is often called a debug access port (DAP) and one implementation is shown in FIG. 2. It provides for the interrogation of the system irrespective of whether it is functional and requires a Debug Test System (DTS) be connected to the dedicated interface to provide this capability. A debug access port (DAP) generally includes a debug port (DP) and one or more access ports.

The debug port 201 enables communication 202 traditionally using IEEE 1149.1 (JTAG), IEEE 1149.7 (cJTAG), or other custom technologies such as Serial Wire Debug (SWD)) between a debugger and one or more access ports (APs). Debugger communication with a DP over a dedicated serial medium such as IEEE 1149.1, 1149.7, or other serial debug interfaces has been an acceptable solution for debugging a system or target system (TS) under development in a lab setting. These interfaces required a dedicated connection specific to the protocol being used. The TS is generally connected to specialized hardware (a Debug Test System (DTS)) that supports the protocol. This connection is generally made through a relative short cable. This debug configuration is not generally useful when debugging a deployed system (as the DTS connection may not be present in the products final form) or a product deployed in a remote setting (not co-located).

Debug Port 201 provides a portal to resources that may or may not normally be accessible to an application. For example, an AP might provide access to:
- system memory or part thereof,
- debug logic distributed through the system
- scan paths
- the state of state machines
- production test logic
- other functions.

A specific implementation of a DAP may have combinations of one or more instances of these Aps (204 . . . 20n) and other types of APs.

An advantage of using a dedicated debug interface for debug is its superior feature set. The errors that can block the availability of the capability provided by an application interface can generally be debugged with a dedicated debug interface. A disadvantage of this interface is that it may be difficult for a person in location A to debug a product in location B. There are two issues in this case, the connection used by the DTS may not be present in the product's final form, and a DTS must be co-located with the system to use this interface. For instance, debugging a problem being observed in a particular cell phone tower in Alaska, a remote-operable DTS would have to be co-located with and connect to the deployed target system.

The subject of this invention is an approach that provides the combined advantages of debug with a dedicated debug interface and debug with an application interface without the disadvantages of either.

Once this concept is implemented, it can be extended to provide access to specialized APs such as a CONFIGURATION-AP and a SECURITY-AP.

Figure 3:
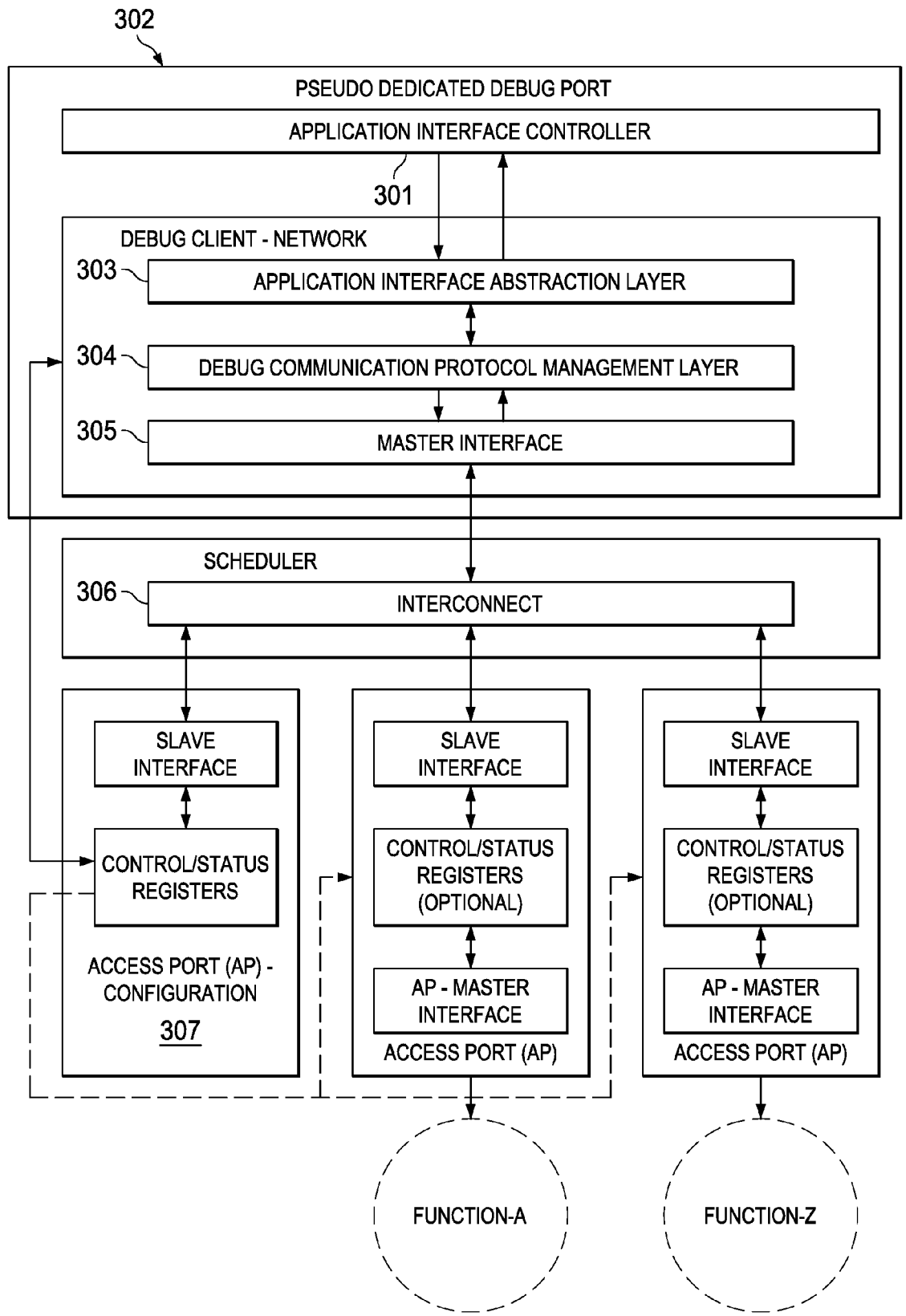
FIG. 3 shows access to debug access ports through a pseudo dedicated debug port.

The typical implementation of this pseudo debug port is shown in FIG. 3. It is shown as having the following components:
1) APPLICATION INTERFACE CONTROLLER 301
2) DEBUG CLIENT A number of other implementations may be used to create the pseudo dedicated Debug Port. The implementation of a debug client may include processors, specialized hardware for initializing the application interface, and other functions not shown in the example.

In a typical implementation, an application interface controller handles the interface protocol. It passes data to the Debug Client and receives data from the Debug Client. The Debug Client processes inbound data, forwarding this data to the APs when necessary. It packages data it creates itself and data provided by APs, delivering this data to the application interface controller.

A Debug Client can be constructed with the following:
1) APPLICATION INTERFACE ABSTRACTION LAYER 303
2) DEBUG COMMUNICATIONS PROTOCOL (DCP) MANAGEMENT LAYER 304
3) MASTER INTERFACE 305

APPLICATION INTERFACE ABSTRACTION LAYER 303 handles the needs of the Application Interface Controller 301. It is responsible for managing transferring and receiving Debug Client data. This may involve direct or indirect interaction with the actual application interface controller depending on the implementation.

DCP PROTOCOL MANAGEMENT LAYER 304 is responsible for creating and processing Debug Client data. Inbound data would generally be a DCP command stream and outbound data would be a DCP response stream. It handles the command and response request protocol. Such a protocol would typically provide the following capabilities:
1) OPEN—Establish a connection with the Debug Client
2) CLOSE—Terminate a connection with the Debug Client
3) AP_READ—Retrieve data from a specified AP
4) AP_WRITE—Move data to a specified AP AP_READ and AP_WRITE command requests will result in the transactions over MASTER INTERFACE 305 in the DP MASTER INTERFACE 305 generates read and write requests to different APs over an INTERCONNECT 306. The INTERCONNECT is responsible for routing a request from the DP to the appropriate AP.

Multiple APs with the same or different capabilities are supported. One variant identifies a CONFIGURATION-AP 307. The CONFIGURATION-AP 307 implements configuration and status registers that control the operation of other APs in the Debug Access Port. Such registers could be used to define extended access properties (such as max burst length, security settings, and other access qualifiers) and observe status information (such as AP FSM status, details about the most recent error, etc.).

In systems that are security conscious, a SECURITY-AP may be included to manage authentication of the entity connected to the application interface and desiring access to other APs.

APs that are accessible within a conventional dedicated debug port become accessible with this approach. This means that once the Debug Client connection is made operable, a system that becomes inoperable or is inoperable from start-up at location A may be debugged from Location B.

In order to use the described invention in an environment where a system is inoperable or may become inoperable, the application interface functionality associated with the debug client must remain operable. There are a number of possible implementations that can ensure this. One possible implementation is to support the management of an application interface's connection using hardware that would not be affected by an inoperable component of the system. An alternate implementation may support a model where a connection to the debug client would only be allowed in an operable state or in some inoperable states but in others. In such an implementation an inoperable state that affects the application interface's ability to communicate with the debug client would not be supported.

What is claimed is:

1. A debug system comprising:
a debug test system,
a target system to be debugged,
a pseudo dedicated debug port, said pseudo dedicated debug port including
an application interface controller,
network abstraction layer, and
a debug client,
a debug access point, said debug access point including
an application interface abstraction layer,
a debug communications protocol management layer, and
a master interface.

2. The debug system of claim 1, wherein:
the pseudo dedicated debug port is operable to function as a network peripheral.

3. The debug system of claim 1, wherein:

the pseudo dedicated debug port is accessible through a network to allow remote debugging.

4. The debug system of claim 1, wherein:

there is a plurality of debug access points operable to communicate with the pseudo dedicated debug port.

5. The debug system of claim 1, wherein:

the debug access points may be operable to provide functions other than access to memory locations.

6. The debug system of claim 1, wherein:

the debug access points may be operable to provide internal state information of the target system.

7. The debug system of claim 1, further comprising:

hardware components that will allow the continuing operation of the pseudo dedicated debug port if the target system becomes inoperable.

8. The debug system of claim 1, wherein:

a means is provided to move debug and test information through the application interface to or from one or more types of access ports.

9. The debug system of claim 1, wherein:

at least one of the access points is a configuration access point that provides access to configuration and status registers that control the operation of a different access point.

10. The debug system of claim 1, wherein:

at least one of the access points is a security access point that manages authentication of connections to the application interface.

11. The debug system of claim 1, wherein:

the debug system is implemented in dedicated hardware.

12. The debug system of claim 1, wherein:

the debug system is implemented as a programmable element.

* * * * *